(12) United States Patent
Keller et al.

(10) Patent No.: US 9,085,720 B2
(45) Date of Patent: Jul. 21, 2015

(54) HIGHLY AROMATIC COMPOUNDS AND POLYMERS AS PRECURSORS TO CARBON NANOTUBE AND METAL NANO PARTICLE COMPOSITIONS SHAPED SOLIDS

(75) Inventors: Teddy M. Keller, Fairfax Station, VA (US); Matthew Laskoski, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 925 days.

(21) Appl. No.: 12/911,117

(22) Filed: Oct. 25, 2010

(65) Prior Publication Data

US 2011/0037020 A1 Feb. 17, 2011

Related U.S. Application Data

(62) Division of application No. 11/018,678, filed on Dec. 22, 2004, now Pat. No. 7,819,938.

(51) Int. Cl.
| | |
|---|---|
| *B82Y 30/00* | (2011.01) |
| *C09K 3/00* | (2006.01) |
| *B22F 1/00* | (2006.01) |
| *B22F 9/30* | (2006.01) |
| *B82Y 40/00* | (2011.01) |

(52) U.S. Cl.
CPC ............... *C09K 3/00* (2013.01); *B22F 1/0018* (2013.01); *B22F 9/30* (2013.01); *B82Y 30/00* (2013.01); *B82Y 40/00* (2013.01); *Y10S 977/842* (2013.01)

(58) Field of Classification Search
CPC .......... B82Y 30/00; B22F 1/0018; B22F 9/30
USPC .................. 75/252, 362; 252/182.12
See application file for complete search history.

(56) References Cited

U.S. PATENT DOCUMENTS

| | | | | |
|---|---|---|---|---|
| 4,245,026 | A | * | 1/1981 | Ziolo ..................... 430/137.1 |
| 4,332,654 | A | * | 6/1982 | Yates ..................... 204/157.74 |
| 4,704,333 | A | | 11/1987 | Elkins et al. |
| 6,846,345 | B1 | * | 1/2005 | Keller et al. ..................... 75/255 |
| 6,884,861 | B2 | * | 4/2005 | Keller et al. ................... 526/285 |
| 6,887,816 | B2 | * | 5/2005 | Tanaka et al. ................. 502/100 |
| 2006/0130609 | A1 | | 6/2006 | Keller et al. |
| 2007/0243124 | A1 | | 10/2007 | Baughman et al. |
| 2008/0171656 | A1 | | 7/2008 | Wang et al. |
| 2009/0269604 | A1 | | 10/2009 | Wang et al. |

OTHER PUBLICATIONS

Search Report and Written Opinion in PCT/US11/23692 (Apr. 7, 2011).
Imimber Bead MSDS (Jul. 2011).

* cited by examiner

*Primary Examiner* — Jie Yang
(74) *Attorney, Agent, or Firm* — US Naval Research Laboratory; Joseph T. Grunkemeyer (57) ABSTRACT

A method of making metal nanoparticles and carbon nanotubes is disclosed. A mixture of a transition metal compound and an aromatic polymer, a precursor of an aromatic polymer, or an aromatic monomer is heated to form a metal nanoparticle composition, optionally containing carbon nanotubes.

4 Claims, 2 Drawing Sheets

HIGHLY AROMATIC COMPOUNDS AND POLYMERS AS PRECURSORS TO CARBON NANOTUBE AND METAL NANO PARTICLE COMPOSITIONS SHAPED SOLIDS

This application is a divisional application of U.S. Pat. No. 7,819,938, issued on Oct. 26, 2010.

BACKGROUND OF THE INVENTION

1. Field of the Invention

The invention relates generally to metal nanoparticle-containing compositions, optionally containing carbon nanotubes.

2. Description of the Prior Art

The discovery of carbon nanotubes has stimulated a great amount of research efforts around the world. Carbon nanotubes are characterized by the near perfect cylindrical structures of seamless graphite. They have been predicted to possess unusual mechanical, electrical, magnetic, catalytic, and capillary properties. A wide range of potential applications has been suggested including uses as one-dimensional conductors for the design of nanoelectronic devices, as reinforcing fibers in polymeric and carbon composite materials, as absorption materials for gases such as hydrogen, and as field emission sources.

Since the discovery of carbon nanotubes, many studies have been carried out in an effort to increase the production yield, to reduce the cost, and to improve the quality of carbon nanotubes. Small quantities of carbon nanotubes can now be produced daily by methods such as arc discharge, laser vaporization, and thermal decomposition of hydrocarbons. These methods yield carbon nanotubes embedded in soot. Synthesis of cost-effective, good quality carbon nanotubes in high yields remains a challenge. Experimental tests and applications of carbon structures have been hampered by the difficulty in obtaining pure, homogenous, and uniform samples of highly graphitized nanotubes. The growth of carbon nanotubes with a tight control over the length, diameter, and alignment is important for both potential applications and detailed characterization of their properties.

SUMMARY OF THE INVENTION

The invention comprises a process comprising the step of heating a mixture of a transition metal compound and a material selected from the group consisting of an aromatic polymer, a precursor of an aromatic polymer, and an aromatic monomer under conditions effective to form a metal nanoparticle composition comprising metal nanoparticles.

The invention further comprises a composition made by the above process.

The invention further comprises the mixture from above.

BRIEF DESCRIPTION OF THE DRAWINGS

A more complete appreciation of the invention will be readily obtained by reference to the following Description of the Example Embodiments and the accompanying drawings.

DETAILED DESCRIPTION OF THE EXAMPLE EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The present invention pertains to a general and broad chemical method for the in situ formation of carbon nanotubes from highly aromatic precursor compounds and polymers. Any aromatic polymer, or precursor or monomer of such, that chars has the possibility of forming a carbon nanotube-metal nanoparticle composition. Polyimides, epoxies, phthalonitriles, cyanate ester resins, polyacrylonitrile, phenolic resins, petroleum and coal pitches, polyaromaticetherketone (PEEK), and polyaromaticsulfones (PES) can be used and converted into carbon nanotube carbonaceous composition by thermal exposure to elevated temperatures. The precursor materials can be either physically mixed with or coated in solution with transition metal compounds, including salts, that decompose upon thermal treatment yielding metal nanoparticles.

Figure 1:
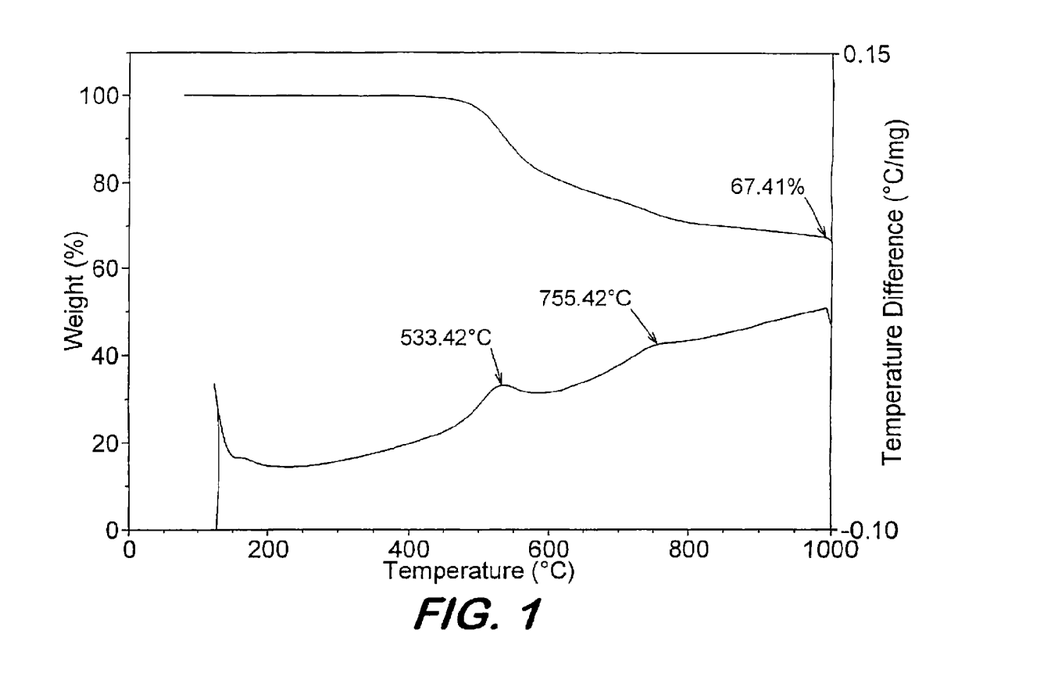
FIG. 1 shows a thermogravimetric thermogram for a phthalonitrile resin heated with $Co_2(CO)_8$ heated to 1000° C.
Figure 2:
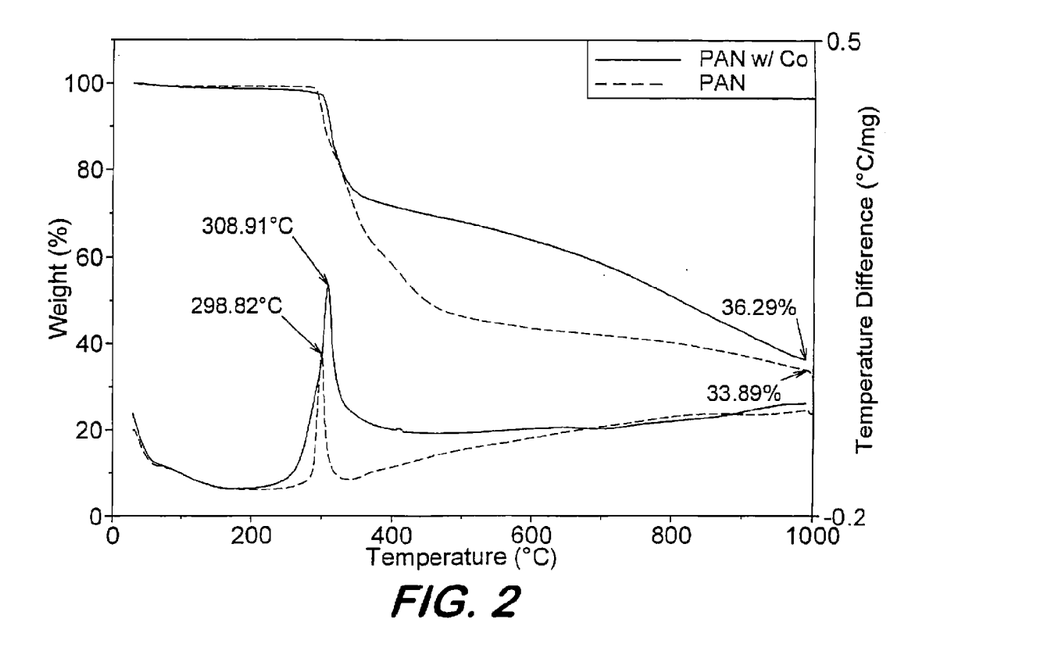
FIG. 2 shows thermogravimetric thermograms for polyacrylonitrile heated to 1000° C. (solid) and polyacrylonitrile and $Co_2(CO)_8$ heated to 1000° C. (dashed).

The resulting metal nanoparticle compositions upon heating to temperatures above 500° C. can afford carbon nanotube-metal nanoparticle compositions. FIGS. 1 and 2 show typical thermogravimetric thermograms for a phthalonitrile resin (FIG. 1) and a polyacrylonitrile (FIG. 2). The amount of carbon nanotubes and metal nanoparticles can depend on at least the temperature exposure and concentration of metal salt, respectively. Depending on the precursor material, film, fiber, solid, and powdered compositions can be easily formulated.

Polyacrylonitrile and the pitches, including fibers thereof, are commercially available and are currently used in the fabrication of carbon and graphite fibers, respectively. Phenolic resins are used as the matrix material in the formulation of carbon-carbon composites. Carbon nanotube fibers and composite matrices can be formulated by the method of this invention. Iron and cobalt salts can be used in the invention. However, any transition metal that has been shown to lead to the formation of carbon nanotubes from organic vapors, thermal deposition of hydrocarbons, and arc discharge may be used to form an organometallic precursor followed by thermal decomposition of the metallic or organometallic unit to metal nanoparticles and formation of carbon nanotubes in the bulk of polymeric and carbon systems, respectively. Large amounts of the appropriate composition can be formulated. Several reactions are shown below.

phthalonitrile

1. Mix with amine and Fe or Co compound
2. Cure
3. Heat to 1000° C.

Carbon Nanotubes cyanate ester

1. Mix with amine and Fe or Co compound
2. Cure
3. Heat to 1000° C.

Carbon Nanotubes epoxy

1. Mix with amine and Fe or Co compound
2. Cure
3. Heat to 1000° C.

Carbon Nanotubes polyacrylonitrile

1. Mix with Fe or Co compound
3. Heat to 1000° C.

Carbon Nanotubes phenolic

1. Mix with tetraamine Fe or Co compound
2. Cure
3. Heat to 1000° C.

Carbon Nanotubes

Figure 3:
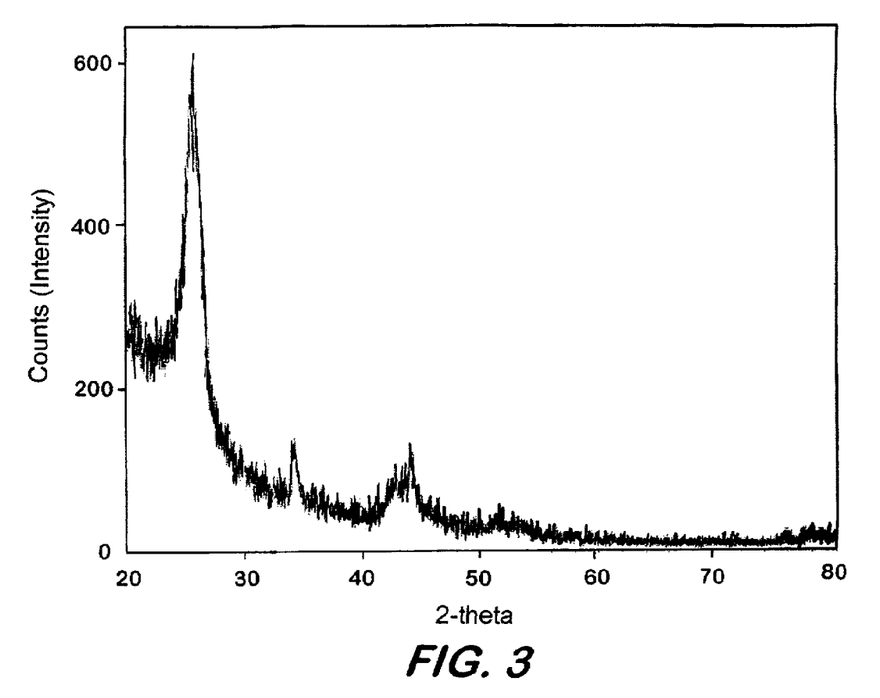
FIG. 3 shows an X-ray diffraction of a phthalonitrile resin following heating with $Co_2(CO)_8$ to 1000° C.
Figure 4:
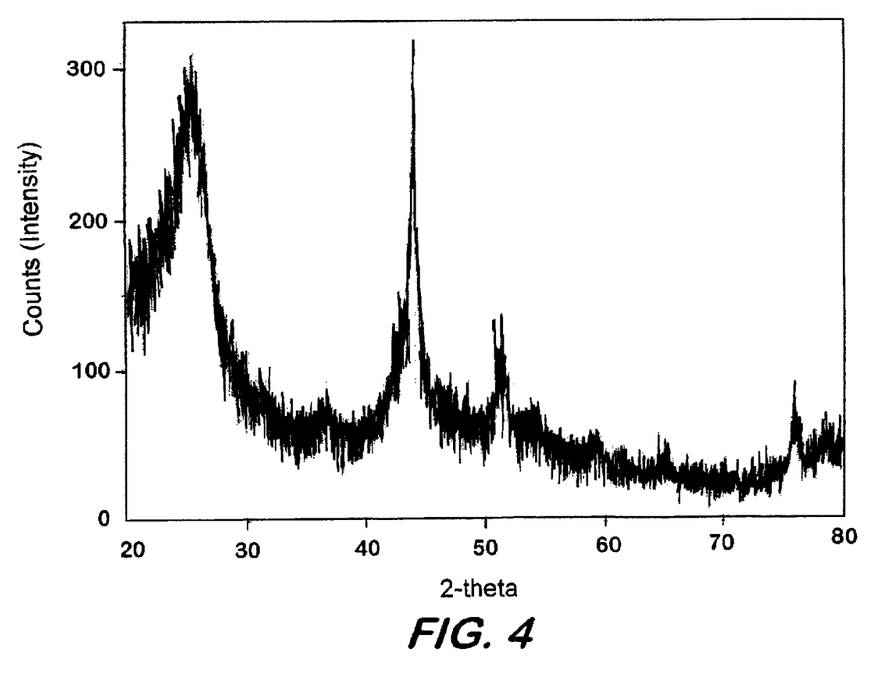
FIG. 4. X-ray diffraction of polyacrylonitrile and $Co_2(CO)_8$ heated to 1000° C.

Depending on the conditions, carbon nanotubes may form either in amorphous carbon or in a highly ordered graphitic domain. The carbon nanotube compositions contain metal nanoparticles in varying amounts depending on the original organometallic concentration or metal salt in the precursor material. Moreover, the carbon nanotube compositions may exhibit magnetic and electrical properties, which can be fine-tuned. The materials of this invention can potentially be useful for structural, data storage, microelectronic, motor, generator, battery, energy storage, and catalytic applications. Typical X-ray results on phthalonitrile (FIG. 3) and polyacrylonitrile (FIG. 4) show that carbon nanotubes and/or filaments are formed in carbonaceous media and their concentration can depend on the thermal exposure condition.

It is believed, though the invention is not so limited, that only metal nanoparticles that are generated in situ and that chemically interact with the precursor organic materials during the heat treatment can be used to form carbon nanotubes within the charred carbonaceous compositions. The metal nanoparticle size and concentration can be readily changed by varying the concentration of precursor material and organometallic compound or metal salt. Metals that are not magnetic can afford metal nanoparticles embedded within the carbonaceous domain.

The physical incorporation or mixing of metal nanoparticles into phenolic resins does not normally afford carbon nanotubes upon heat treatment to elevated temperatures. However, by forming the metal nanoparticles in situ within the polymeric material followed by thermal exposure to elevated temperatures resulting in the carbonization process, the carbon nanotube formation can occur. Also, the precursor compounds melt or are in the liquid form, which can enhance their importance in the formation of films, fibers, and shaped solid structural components containing carbon nanotubes.

Typical methods can be as follows: (1) the polymers or precursor materials and various amounts of an organometallic compound or metal salt are mixed in methylene chloride or hexane with stirring followed by concentration to dryness or (2) the polymers or precursor materials and various amounts of an organometallic compound or metal salt are thoroughly mixed physically in a solid composition. The compositions formulated by either of the two methods are heated to various temperatures up to 1300° C. The organometallic compound or metal salt decomposes above 300° C. resulting in the formation of nanoparticles (including metal atoms and clusters) that are responsible for the development of the carbon nanotubes. The properties of the carbon nanotube-metal nanoparticle composition may depend on the heat treatment, time of thermal exposure, and concentration of metal particles.

Heat treatment of the precursor-metal systems under inert conditions at 300-500° C. can result in the formation of elemental metal (Fe and Co) in an insulating matrix as determined by the attraction of the composition to a magnet. More importantly, the magnetic compositions may retain excellent structural integrity. The polymers may also exhibit high thermal stability. The different polymers with various concentrations of metal particle sizes can have distinct properties, which would be expected to affect the characteristics of the final metal containing systems. X-ray analysis shows the presence of carbon nanotubes in the developing carbonaceous system when heated above 500° C. or 600° C. Only a trace amount of transition metal (Co and Fe) appears needed to ensure the formation of carbon nanotubes.

Depending on the precursor system and application, fibers, films, powders, and matrix components can be formulated by the chemical method of the invention. The metal nanoparticle, carbon nanotube, and carbon nanotube-metal nanoparticle compositions may have novel magnetic, electrical, catalytic, and structural properties. The precursor compounds may be commercially available and currently produced inexpensively in large quantities.

Materials (polyacrylonitrile and the pitches) that are presently being used to fabricate commercial carbon and graphitic fibers can be used and converted into carbon nanotube and carbon nanotube-metal nanoparticle fibers. Magnetic carbon nanotube fibers can be realized by the method of this invention for potential electrical and magnetic device applications. Phenolic resins (an inexpensive source of carbon) can be converted into a carbon nanotube carbonaceous composition. In essence, carbon nanotube-carbon nanotube carbonaceous, carbon nanotube-carbon, carbon nanotube-metal nanoparticle, or carbon-carbon nanotube composite components can be formulated by the method. Phenolic resin systems are typically used in the formulation of carbon-carbon composites. High performance and high temperature polymers such as the polyimides, epoxies, phthalonitriles, cyanate ester resins, polyaromaticetherketone (PEEK), and polyaromaticsulfones (PES) are commercially available and can be used in the formulation of a bulk solid, fiber, and/or film-containing carbon nanotube composition. Depending on the formulation parameters, the physical properties can be varied for potential magnetic, electrical, structural, catalytic, and medical applications.

The approach allows for the in situ formation of metal nanoparticles and carbon nanotubes-metal nanoparticles within a high performance polymeric system and carbonaceous composition, respectively. The ability to control the amount and size of the metal nanoparticles within the polymeric and carbon nanotube composition can be readily achieved. Control of the carbon nanotube and metal nanoparticle concentration is important for the various potential applications. Upon gelation, the mobility of the metal particles will be reduced and the metal particles will be less free to move within the developing solid composition. Besides Fe and Co systems, any transition metal salt, organometallic compound, metal alloy, or combination thereof that decomposes into metal atoms such as Ni, Ru, Os, Mo, W, etc., may be used as the metal source for the formation of carbon nanotubes.

The process of the invention comprises a single step and, optionally, a second step. Both steps are heating steps. In the first heating step, a mixture of a transition metal compound and a material selected from the group consisting of an aromatic polymer, a precursor of an aromatic polymer, and an aromatic monomer is heated. The heating conditions are effective to form a metal nanoparticle composition comprising metal nanoparticles. Metal nanoparticles may be formed from a wide variety of transition metal compounds and materials. Either the transition metal compound, the material, or both may be a single compound, or a combination of compounds.

Suitable metallic atoms in the transition metal compound include, but are not limited to, iron, cobalt, nickel, ruthenium, osmium, molybdenum, tungsten, yttrium, lutetium, boron, copper, manganese, silicon, chromium, zinc, palladium, silver, platinum, tin, tellurium, bismuth, germanium, antimony, aluminum, indium, sulfur, selenium, cadmium, gadolinium, hafnium, magnesium, titanium, lanthanum, cerium, praseodymium, neodymium, terbium, dysprosium, holmium, erbium, and combinations thereof.

Suitable transition metal compounds include, but are not limited to, iron-containing compound, cobalt-containing compound, metal complex, metallocene compound, octacarbonyl dicobalt, 1-(ferrocenylethynyl)-3-(phenylethynyl)benzene, a ferrocenyl compound, a metallocenylethynyl compound, 1,4-bis(ferrocenyl)butadiyne, metallocenyl ethynylaromatic compound, 1,3-bis(ferrocenylethynyl)benzene, 1,4-bis(ferrocenylethynyl)benzene, 1-(ferrocenylethynyl)-4-(phenylethynyl)benzene, 1,3,5-tris(ferrocenylethynyl)benzene, a metallocenylethynyl phosphine metal salt, bis(ferrocenylethynyl)-bis(triphenylphosphine)nickel, bis(ferrocenylethynyl)-bis(triethylphosphine)palladium, bis(ferrocenylethynyl)-bis(triethylphosphine)platinum, metal carbonyl salt, nonacarbonyl diiron, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, metal carbonyl-ethynyl complex, hexacarbonyl dicobalt complex of 1,2,4,5-tetrakis(phenylethynyl)benzene, hexacarbonyl diiron complex of 1,2,4,5-tetrakis(phenylethynyl)benzene, nonacarbonyl triruthenium complex of 1,2,4,5-tetrakis(phenylethynyl)benzene, a metal carbonyl-metallocenylethynyl containing complex, hexacarbonyl dicobalt complex of 1,4-bis(ferrocenyl)butadiyne, hexacarbonyl dicobalt complex of 1-(ferrocenylethynyl)-4-(phenylethynyl)benzene, hexacarbonyl dicobalt complex of 1-(ferrocenylethynyl)-3-(phenylethynyl)benzene, hexacarbonyl dicobalt-ethynyl complex group, hexacarbonyl diiron-ethynyl complex group, nonacarbonyl triruthenium-ethynyl complex group, a compound that decomposes at a temperature higher than room temperature to produce free metal atoms or metal nanoparticles, and combinations thereof.

The material may have an aromatic backbone and may be free of ethynyl groups. Suitable materials include, but are not limited to, aromatic phthalonitrile resin, aromatic cyanate ester resin, aromatic epoxy resin, aromatic polyethersulfone, aromatic polyetheretherketone, phenolic resin, aromatic polyimide, poly(phenylene sulfide), polycarbonate, coal pitch, petroleum pitch, polyacrylonitrile, polyacrylonitrile fiber, oligomer of bisphenol A and benzophenone terminated with phthalonitrile, oligomer of bisphenol A and 1,3-dibromobenzene terminated with cyanate ester, novolac epoxy resin, poly(1,4-phenylene sulfide), poly(bisphenol A carbonate), and combinations thereof.

The material may be a precursor to an aromatic polymer or an aromatic monomer. In these cases, the heating converts this material into an aromatic polymer. The precursor can be any material that can be aromatized. An example precursor is polyacrylonitrile. This polymer is used in making carbon fibers and is known to become an aromatic polymer when it is heated in air. Other examples include polyethylene and polypropylene, which normally form no char in air, but which can be aromatized. Aromatization may be done by heat to a low temperature in air. This may also increase the char yield. Subsequent heating to an elevated temperature in an inert atmosphere can then produce carbonization. In the case of polyacrylonitrile, aromatization (also called stabilization or cyclization) may be done in air at temperatures less than about 325° C. This can form thermally-stable ladder structures through cyclization reactions. Longer heating times can promote further aromatization. Nitrogen may be removed from aromaticized polyacrylonitrile by heating to over about 600° C., evolving gasses such as HCN, $NH_3$, and $N_2$. When an aromatic monomer is used, such as a phthalonitrile, cyanate ester, or phenolic, a curing additive may also be added to convert the monomer to a polymer. A suitable curing additive for some of the previously mentioned polymers is an amine, a tetraamine, or bis[4-(3-aminophenoxy)phenyl]sulfone.

The first heating step generally results in a composition comprising metal nanoparticles. This may occur when heating to at least about 300° C. A second heating step may be performed that may produce a composition comprising metal nanoparticles and carbon nanotubes. This may occur when heating to at least about 500° C.

The resulting composition, with or without carbon nanotubes, can be a solid and may be in the form of a fiber or a film. In particular, a carbon nanotube fiber may be made by combining polyacrylonitrile with a transition metal compound, drawing the mixture into a fiber, and heating the fiber. Methods of drawing polyacrylonitrile fibers are well known in the art.

Having described the invention, the following examples are given to illustrate specific applications of the invention. These specific examples are not intended to limit the scope of the invention described in this application.

Example 1

Synthesis of 1/20 Molar Octacarbonyldicobalt/Polyacrylonitrile Mixture $Co_2(CO)_8$ (50 mg, 0.146 mmol), polyacrylonitrile (1.00 g), and 10 mL of methylene chloride were added to a 50 mL round bottomed flask. The polyacrylonitrile did not dissolve. The slurry was allowed to stir for 5 min before the solvent was removed under reduced pressure. The mixture was vacuum dried and isolated as an off-white solid.

Example 2

Thermal Conversion of 1/20 Molar Octacarbonyldicobalt/Polyacrylonitrile Mixture to Carbon Nanotube-Cobalt Nanoparticle Composition The mixture from Example 1 (22.8 mg) was heated in a TGA chamber under nitrogen at 10° C./min to 1000° C. resulting in a shaped composition and a char yield of 36%. The DTA curve showed an exotherm at 308° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt nanoparticles. The x-ray (002) reflection for carbon nanotubes is readily apparent.

Example 3

Pre-Oxidation and Thermal Conversion of 1/20 Molar Octacarbonyldicobalt/Polyacrylonitrile Mixture to Carbon Nanotube-Cobalt Nanoparticle Composition The mixture from Example 1 (25.52 mg) was heated in a TGA chamber at 10° C./min to 280° C. under air and isothermed for 1.5 hr. The resulting solid was further heated at 10° C./min to 1000° C. under nitrogen resulting in a shaped composition and an overall char yield of 45%. The thermogram is shown in FIG. 2. X-ray studies confirm the presence of carbon nanotubes-cobalt nanoparticles in the carbon composition. The x-ray diffraction study (FIG. 4) showed the four characteristic reflections [(002), (100), (004), and (110)] values for carbon nanotubes and the pattern for cobalt nanoparticles. The x-ray (002) reflection for carbon nanotubes is readily apparent.

Example 4

Synthesis of 1/40 Molar Octacarbonyldicobalt/Polyacrylonitrile Mixture $Co_2(CO)_8$ (20 mg, 0.0584 mmol), polyacrylonitrile (1.00 g), and 10 mL of methylene chloride were added to a 50 mL round bottomed flask. The polyacrylonitrile did not dissolve. The slurry was allowed to stir for 5 min before the solvent was removed under reduced pressure. The mixture was vacuum dried and isolated as an off-white solid.

Example 5

Thermal Conversion of 1/40 Molar Octacarbonyldicobalt/Polyacrylonitrile Mixture to Carbon Nanotube-Cobalt Nanoparticle Composition The mixture from Example 4 (25.00 mg) was heated in a TGA chamber under nitrogen at 10° C./min to 1000° C. resulting in a shaped composition and a char yield of 37%. The DTA curve showed an exotherm at 304° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt nanoparticles. The x-ray (002) reflection for carbon nanotubes is readily apparent.

Example 6

Synthesis of 1/100 Molar Octacarbonyldicobalt/Polyacrylonitrile Mixture $Co_2(CO)_8$ (10 mg, 0.0292 mmol), polyacrylonitrile (1.00 g), and 10 mL of methylene chloride were added to a 50 mL round bottomed flask. The polyacrylonitrile did not dissolve. The slurry was allowed to stir for 5 min before the solvent was removed under reduced pressure. The mixture was vacuum dried and isolated as an off-white solid.

Example 7

Thermal Conversion of 1/100 Molar Octacarbonyldicobalt/Polyacrylonitrile Mixture to carbon nanotube-cobalt nanoparticle composition—The mixture from Example 6 (25.32 mg) was heated in a TGA chamber under nitrogen at 10° C./min to 1000° C. resulting in a shaped composition and a char yield of 35%. The DTA curve showed an exotherm at 295° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt nanoparticles. The x-ray (002) reflection for carbon nanotubes is readily apparent.

Example 8

Synthesis of 1/20 molar 1-(ferrocenylethynyl)-3-(phenylethynyl)benzene/polyacrylonitrile Mixture 1-(ferrocenylethynyl)-3-(phenylethynyl)benzene (10 mg, 0.0259 mmol), polyacrylonitrile (500 mg), and 10 mL of methylene chloride were added to a 50 mL round bottomed flask. The polyacrylonitrile did not dissolve. The slurry was allowed to stir for 5 min before the solvent was removed under reduced pressure. The mixture was vacuum dried and isolated as an orange solid.

Example 9

Thermal conversion of 1/20 molar 1-(ferrocenylethynyl)-3-(phenylethynyl)-benzene/polyacrylonitrile Mixture to Carbon Nanotube-Iron Nanoparticle Composition The mixture from Example 8 (30.26 mg) was heated in a TGA chamber under nitrogen at 10° C./min to 1000° C.

resulting in a shaped composition and a char yield of 33%. The DTA curve showed an exotherm at 297° C. X-ray studies confirm the presence of carbon nanotubes-iron nanoparticles in the carbon composition. The x-ray diffraction study showed the four characteristic reflections [(002), (100), (004), and (110)] values for carbon nanotubes and the pattern for iron nanoparticles. The x-ray (002) reflection for carbon nanotubes is readily apparent.

Example 9 (Comparative)

Thermal Conversion of Polyacrylonitrile to a Carbon Composition

A sample of polyacrylonitrile (24.87 mg) was heated in a TGA chamber under nitrogen at 10° C./min to 1000° C. resulting in a shaped composition and a char yield of 34%. The DTA curve showed an exotherm at 300° C. X-ray studies confirm the absence of carbon nanotubes in the carbon composition.

Example 10

Synthesis of 1/20 Molar Octacarbonyldicobalt/Phthalonitrile Mixture

The phthalonitrile resin (a 2:1 oligomer of bisphenol A and benzophenone capped with phthalonitrile units) (200 mg, 0.225 mmol) was dissolved in 10 mL of methylene chloride in a 25 mL round bottomed flask. $Co_2(CO)_8$ (10 mg, 0.0292 mmol) dissolved in 2 mL of hexanes was added and a brown precipitate formed. The solvent was removed under reduced pressure, the mixture vacuum dried, and the product isolated as a dark brown solid.

Example 11

Thermal Conversion of 1/20 Molar Octacarbonyldicobalt/Phthalonitrile Mixture to Carbon Nanotube-Cobalt Nanoparticle Composition The mixture from Example 10 (38.01 mg) was heated in a TGA chamber under nitrogen at 10° C./min to 1000° C. resulting in a shaped composition and a char yield of 47%. The DTA curve showed exotherms at 163, 276, 514, and 868° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt nanoparticles. The x-ray (002) reflection for carbon nanotubes is readily apparent.

Example 12

Thermal conversion of 1/20 molar octacarbonyldicobalt/phthalonitrile/bis[4-(3-aminophenoxy)phenyl] sulfone Mixture to Carbon Nanotube-Cobalt Nanoparticle Composition The mixture from Example 10 (100 mg) was melted with bis[4-(3-aminophenoxy)phenyl]sulfone (2 mg) at 180° C. The mixture was cooled and a sample cured under nitrogen in a TGA chamber by heating at 250° C. for 1 hr, 300° C. for 2 hr, 350° C. for 6 hr, and 375° C. for 4 hr. The shaped composition was cooled and heated under nitrogen at 10° C./min to 1000° C. resulting in a char yield of 67%. The DTA curve showed exotherms at 530 and 751° C. (FIG. 1). X-ray studies confirm the presence of carbon nanotubes-cobalt nanoparticles in the carbon composition. The x-ray diffraction study (FIG. 3) showed the four characteristic reflections [(002), (100), (004), and (110)] values for carbon nanotubes and the pattern for cobalt nanoparticles. The x-ray (002) reflection for carbon nanotubes is readily apparent at a 2-theta of 25.9.

Example 13

Synthesis of 1/20 Molar Octacarbonyldicobalt/Cyanate Ester Mixture

The cyanate ester resin (a 2:1 oligomer of bisphenol A and 1,3-dibromobenzene terminated with cyanate ester units) (1.09 g, 1.88 mmol) was dissolved in 10 mL of methylene chloride in a 25 mL round bottomed flask. $Co_2(CO)_8$ (55 mg, 0.161 mmol) dissolved in 2 mL of hexanes was added. The mixture was stirred for 5 min and the solvent was removed under reduced pressure. The mixture was vacuum dried and the product isolated as a blue oil.

Example 14

Thermal Conversion of 1/20 Molar Octacarbonyldicobalt/Cyanate Ester Mixture to Carbon Nanotube-Cobalt Nanoparticle Composition The sample of the mixture from Example 13 (31.38 mg) was cured under nitrogen in a TGA chamber by heating at 100° C. for 1 hr, 150° C. for 2 hr, 200° C. for 2 hr, 300° C. for 2 hr, and 350° C. for 1 hr. The shaped composition was cooled and heated at 10° C./min to 1000° C. under nitrogen resulting in a char yield of 34%. The DTA curve showed exotherms at 549 and 810° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 15

Synthesis of 1/20 molar octacarbonyldicobalt/epoxy mixture

The epoxy novolac resin (supplied by The Dow Chemical Company) (2.34 g), 1,3-bis(3-aminophenoxy)-benzene (1.17 g, 4.00 mmol), and $Co_2(CO)_8$ (175 mg, 0.513 mmol) were dissolved in 10 mL of methylene chloride in a 25 mL round bottomed flask. The mixture was stirred for 5 min and the solvent was removed under reduced pressure. The mixture was vacuum dried and the product isolated as a blue oil.

Example 16

Thermal Conversion of 1/20 Molar Octacarbonyldicobalt/Epoxy Mixture to Carbon Nanotube-Cobalt Nanoparticle Composition A sample of the mixture from Example 15 (56.16 mg) was cured under nitrogen in a TGA chamber by heating at 80° C. for 2 hr, 100° C. for 1 hr, 150° C. for 1 hr, 200° C. for 1 hr, and 250° C. for 1 hr. The shaped composition was cooled and heated at 10° C./min to 1000° C. under nitrogen resulting in a char yield of 23%. The DTA curve showed an exotherm at 831° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 17

Synthesis of 1/20 Molar Octacarbonyldicobalt/Polyethersulfone Mixture

The polyethersulfone (200 mg) and $Co_2(CO)_8$ (10 mg, 0.0292 mmol) were dry mixed and pulverized for 5 min in a Wiggle-Bug. The mixture was used in the TGA studies.

Example 18

Thermal Conversion of 1/20 Molar Octacarbonyldicobalt/Polyethersulfone Mixture to Carbon Nanotube-Cobalt Nanoparticle Composition A sample of the mixture from Example 17 (39.49 mg) was heated in a TGA chamber at 10° C./min to 1000° C. under nitrogen resulting in a shaped composition and a char yield of 44%. The DTA curve showed an exotherm at 581° C. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 19

Synthesis of 1/20 Molar Octacarbonyldicobalt/Polyetheretherketone (PEEK) Mixture The PEEK (200 mg) and $Co_2(CO)_8$ (10 mg, 0.0292 mmol) were dry mixed and pulverized for 5 min in a Wiggle-Bug. The mixture was used in the TGA studies.

Example 20

Thermal Conversion of 1/20 Molar Octacarbonyldicobalt/PEEK Mixture to Carbon Nanotube-Cobalt Nanoparticle Composition A sample of the mixture from Example 19 (35.25 mg) was heated in a TGA chamber at 10° C./min to 1000° C. under nitrogen resulting in a shaped composition and a char yield of 42%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 21

Synthesis of 1/20 Molar Octacarbonyldicobalt/Polypropylene Mixture

The polypropylene (1.07 g) and $Co_2(CO)_8$ (54 mg, 0.158 mmol) were mixed together in 10 mL of methylene chloride. The polypropylene did not dissolve. The mixture was stirred for 5 min and the solvent was removed under reduced pressure. The mixture was vacuum dried and the product isolated as off-white solid.

Example 22 (Comparative)

Heating of 1/20 molar octacarbonyldicobalt/polypropylene mixture—A sample of the mixture from Example 21 (39.49 mg) was heated in a TGA chamber at 10° C./min to 500° C. under nitrogen at which time the polypropylene decomposed resulting in no weight retention.

Example 23

Synthesis of 1/20 Molar Octacarbonyldicobalt/Phenolic Resin Mixture

The phenolic resin (1.00 g) (a novolac-type phenol-formaldehyde polymer), octamethylenetetramine (80 mg, 0.571 mmol) and $Co_2(CO)_8$ (50 mg, 0.146 mmol) were mixed together in 10 mL of methylene chloride. The mixture was stirred for 5 min and the solvent was removed under reduced pressure. The mixture was vacuum dried and the product isolated as brown solid.

Example 24

Heating of 1/20 Molar Octacarbonyldicobalt/Phenolic Resin Mixture

A sample of the mixture from Example 23 (23.03 mg) was cured under nitrogen in a TGA chamber by heating at 150° C. for 2 hr, 200° C. for 2 hr, 300° C. for 1 hr, and 350° C. for 1 hr. The shaped composition was cooled and heated at 10° C./min to 1000° C. under nitrogen resulting in a char yield of 50%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 25

Synthesis of 1/20 Molar Octacarbonyldicobalt/Polyimide Mixture

The polyimide monomer (500 mg) (THERMID 600) and $Co_2(CO)_8$ (25 mg, 0.0730 mmol) were mixed together in 10 mL of methylene chloride. The polyimide did not dissolve. The mixture was stirred for 5 min and the solvent was removed under reduced pressure. The mixture was vacuum dried and the product isolated as a brown solid.

Example 26

Heating of 1/20 Molar Octacarbonyldicobalt/Polyimide Mixture

A sample of the mixture from Example 25 (56.16 mg) was cured under nitrogen in a TGA chamber by heating at 315° C. for 3 hr. The shaped composition was cooled and heated at 10° C./min to 1000° C. under nitrogen resulting in a char yield of 60%. X-ray studies confirm the presence of carbon nanotubes-cobalt nanoparticles in the carbon composition. The

Example 27

Synthesis of 1/20 Molar Octacarbonyldicobalt/Polyphenylene Sulfide Mixture

The powdered poly(1,4-phenylene sulfide) (1.00 g) and $Co_2(CO)_8$ (50 mg, 0.146 mmol) were mixed together in 5 mL of methylene chloride. The heterogeneous mixture was stirred for 5 min and the solvent was removed under reduced pressure. The mixture was vacuum dried and the product isolated.

Example 28

Heating of 1/20 Molar Octacarbonyldicobalt/Polyphenylene Sulfide Mixture

A sample of the mixture from Example 27 (35.25 mg) was heated at 10° C./min to 1000° C. under nitrogen resulting in a shaped component with a char yield of 40%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 29

Synthesis of 1/20 Molar Octacarbonyldicobalt/Polycarbonate Mixture

The powdered poly(bisphenol A carbonate) (2.00 g) and $Co_2(CO)_8$ (100 mg, 0.293 mmol) were mixed together in 5 mL of methylene chloride. The heterogeneous mixture was stirred for 5 min and the solvent was removed under reduced pressure. The mixture was vacuum dried and the product isolated.

Example 30

Heating of 1/20 Molar Octacarbonyldicobalt/Polycarbonate Mixture

A sample of the mixture from Example 29 (22.48 mg) was heated at 10° C./min to 1000° C. under nitrogen resulting in a shaped component with a char yield of 35%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 31

Synthesis of 1/20 Molar Octacarbonyldicobalt/Coal Pitch Mixture

The coal tar pitch (1.18 g) and $Co_2(CO)_8$ (59 mg, 0.172 mmol) were mixed together in 5 mL of methylene chloride. The mixture was stirred for 5 min and the solvent was removed under reduced pressure. The mixture was vacuum dried and the product isolated as a black oil.

Example 32

Heating of 1/20 Molar Octacarbonyldicobalt/Coal Pitch Mixture

A sample of the mixture from Example 31 (45.92 mg) was heated at 10° C./min to 1000° C. under nitrogen resulting in a shaped component with a char yield of 30%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 33

Synthesis of 1/20 Molar Octacarbonyldicobalt/Petroleum Pitch Mixture

The petroleum pitch (1.05 g) and $Co_2(CO)_8$ (53 mg, 0.154 mmol) were mixed together in 5 mL of methylene chloride. The mixture was stirred for 5 min and the solvent was removed under reduced pressure. The mixture was vacuum dried and the product isolated as a black oil.

Example 34

Heating of 1/20 Molar Octacarbonyldicobalt/Petroleum Pitch Mixture

A sample of the mixture from Example 33 (52.22 mg) was heated at 10° C./min to 1000° C. under nitrogen resulting in a shaped component with a char yield of 29%. X-ray studies confirm the presence of carbon nanotubes-cobalt nanoparticles in the carbon composition. The x-ray diffraction study showed the four characteristic reflections [(002), (100), (004), and (110)] values for carbon nanotubes and the pattern for cobalt and cobalt oxide nanoparticles. The x-ray (002) reflection for carbon nanotubes is readily apparent.

Example 35

Fabrication of "Bucky Paper" from octacarbonyldicobalt/phthalonitrile/bis[4-(3-aminophenoxy)phenyl] sulfone CNT Sample The CNT sample from Example 12 (0.50 g) was pulverized using a Wiggle Bug for 15 min. The powdered sample was sonicated for 15 min with concentrated hydrochloric acid. The slurry was filtered using a 0.2 micron PTFE filter paper and washed with water until neutral. The CNT sample was vacuum dried at 100° C. for 18 hours.

The dry, powdered CNT sample was added to a 250 mL flame-dried reaction flask fitted with an argon inlet and a condenser. Fuming sulfuric acid (125 mL, 30% fuming) was added to the flask under argon and the slurry heated to 125° C. for 3 days. The cooled contents of the flask were added dropwise to chilled diethyl ether (500 mL) with vigorous stirring. The solution was filtered through a PTFE filter paper and the CNT sample re-dispersed in a diethyl ether/acetonitrile (1:1, 200 mL) solution. The suspension was sonicated for 15 min and the CNT precipitate recovered by filtration. The CNT filtrated precipitate was annealed by heating to 1000° C. resulting in a solid CNT layer that exhibited good mechanical integrity.

Example 36

Fabrication of "Bucky Paper" from Octacarbonyldicobalt/Polyimide CNT Sample

The CNT sample from Example 26 (0.20 g) was pulverized using a Wiggle Bug for 15 min. The powdered sample was sonicated for 15 min with concentrated hydrochloric acid. The slurry was filtered using a 0.2 micron PTFE filter paper and washed with water until neutral. The CNT sample was vacuum dried at 100° C. for 18 hours.

The dry, powdered CNT sample was added to a 250 mL flame-dried reaction flask fitted with an argon inlet and a condenser. Fuming sulfuric acid (100 mL, 30% fuming) was added to the flask under argon and the slurry heated to 125° C. for 3 days. The cooled contents of the flask were added dropwise to chilled diethyl ether (500 mL) with vigorous stirring. The solution was filtered through a PTFE filter paper and the CNT sample re-dispersed in a diethyl ether/acetonitrile (1:1, 150 mL) solution. The suspension was sonicated for 15 min and the CNT precipitate recovered by filtration. The CNT filtrated precipitate was annealed by heating to 1000° C. resulting in a solid CNT layer that exhibited good mechanical integrity.

Example 37

Fabrication of CNT fibers from the octacarbonyldicobalt/phthalonitrile/bis[4-(3-aminophenoxy)phenyl] sulfone Sample The mixture from Example 10 (250 mg) and bis[4-(3-aminophenoxy)phenyl]sulfone (p-BAPS) (12.5 mg) were placed in an aluminum pan treated with a high temperature mold release. The mixture was heated at 350° C. with stirring and held at that temperature until the mixture became too viscous to stir easily. A glass pipette was inserted into the mixture and pulled out resulting in the formation of fibers. The fibers were heat treated at 200° C. for 2 hr, 250° C. for 12 hr in air and 300° C. for 4 hr, 350° C. for 2 hr and 375° C. for 4 hr under argon. The fibers were further carbonized by heating under argon to 1000° C. at 0.3° C./min.

Obviously, many modifications and variations of the present invention are possible in light of the above teachings. It is therefore to be understood that the claimed invention may be practiced otherwise than as specifically described.

What is claimed is:

1. A mixture comprising:
    a transition metal compound selected from metal complex, metallocene compound, metal carbonyl salt, phosphine metal salt, metal carbonyl-ethynyl complex, and metal carbonyl-metallocenylethynyl containing complex; and
    a material selected from the group consisting of an aromatic polymer, a precursor of an aromatic polymer, and an aromatic monomer;
    wherein the material is free of ethynyl groups.

2. The mixture of claim 1, wherein the transition metal compound is selected from octacarbonyl dicobalt, 1-(ferrocenylethynyl)-3-(phenylethynyl)benzene, and combinations thereof.

3. The mixture of claim 1, wherein the material comprises an aromatic backbone.

4. The mixture of claim 1, wherein the material is selected from the group consisting of aromatic phthalonitrile resin, aromatic cyanate ester resin, aromatic epoxy resin, aromatic polyethersulfone, aromatic polyetheretherketone, phenolic resin, aromatic polyimide, poly(phenylene sulfide), polycarbonate, coal pitch, petroleum pitch, polyacrylonitrile, polyacrylonitrile fiber, pitch fiber, oligomer of bisphenol A and benzophenone terminated with phthalonitrile, oligomer of bisphenol A and 1,3-dibromobenzene terminated with cyanate ester, novolac epoxy resin, poly(1,4-phenylene sulfide), poly(bisphenol A carbonate), and combinations thereof.

* * * * *